(12) United States Patent
Suchý

(10) Patent No.: US 12,473,152 B2
(45) Date of Patent: Nov. 18, 2025

(54) GUARD APPARATUS FOR A CONVEYOR SYSTEM

(71) Applicant: Intelligrated Headquarters, LLC, Mason, OH (US)

(72) Inventor: Jan Suchý, Zlín (CZ)

(73) Assignee: Intelligrated Headquarters, LLC, Mason, OH (US)

( * ) Notice: Subject to any disclaimer, the term of this patent is extended or adjusted under 35 U.S.C. 154(b) by 84 days.

(21) Appl. No.: 18/591,544

(22) Filed: Feb. 29, 2024

(65) Prior Publication Data

US 2025/0276855 A1   Sep. 4, 2025

(51) Int. Cl.
*B65G 39/12* (2006.01)
*B65G 13/00* (2006.01)
*B65G 13/11* (2006.01)
*B65G 47/66* (2006.01)

(52) U.S. Cl.
CPC .............. *B65G 39/12* (2013.01); *B65G 13/11* (2013.01); *B65G 47/66* (2013.01); *B65G 13/00* (2013.01); *B65G 2207/40* (2013.01)

(58) Field of Classification Search
CPC .... B65G 39/12; B65G 2207/40; B65G 47/66; B65G 31/11; B65G 13/00
USPC .................................. 193/35 R, 37
See application file for complete search history.

(56) References Cited

U.S. PATENT DOCUMENTS

| | | |
|---|---|---|
| 2,624,444 A | 1/1953 | Casabona |
| 5,971,129 A | 10/1999 | Stawniak et al. |
| 7,284,658 B2 * | 10/2007 | Wiggins ................ B65G 39/12 198/860.3 |
| 7,882,944 B1 | 2/2011 | Eubanks et al. |
| 8,365,899 B2 | 2/2013 | McKee |
| 9,027,738 B2 | 5/2015 | Coen et al. |
| 9,452,896 B2 | 9/2016 | Lee |
| 9,663,306 B2 | 5/2017 | Pettinga |
| 9,758,317 B2 | 9/2017 | Sammauro |
| 10,556,755 B2 | 2/2020 | Pettinga |

(Continued)

FOREIGN PATENT DOCUMENTS

| | | |
|---|---|---|
| CA | 2755249 A | 9/2010 |
| CN | 110691744 A | 1/2020 |
| DE | 1602097 A1 | 4/1970 |
| DE | 19858521 A1 | 6/2000 |

(Continued)

OTHER PUBLICATIONS

U.S. Non-Provisional Utility Patent Application for "Guard Assembly for a Conveyor System", unpublished (Filed Feb. 29, 2024), Jan Suchý (Inventor), Intelligrated Headquarters, LLC (Applicant), U.S. Appl. No. 18/591,511.

(Continued)

*Primary Examiner* — James R Bidwell
(74) *Attorney, Agent, or Firm* — Alston & Bird LLP

(57) ABSTRACT

Various embodiments are directed to a guard apparatus for a conveyor system. The conveyor system comprises a plurality of rollers rotatably disposed between a pair of side frames of the conveyor system. The guard apparatus comprises a top cover and a first flange. The top cover is disposed in a first gap formed between a first roller and a second roller of the plurality of rollers. The first flange extends from a first end of the top cover into a second gap formed between a first end face of the first roller, a second end face of the second roller and a corresponding side frame of the conveyor system.

15 Claims, 4 Drawing Sheets

(56) References Cited

U.S. PATENT DOCUMENTS

| | | | |
|---|---|---|---|
| 10,807,809 B1 | 10/2020 | Deboer et al. | |
| 11,597,604 B1* | 3/2023 | Simon | B65G 13/07 |
| 11,629,010 B1 | 4/2023 | Defant et al. | |
| 11,661,283 B2 | 5/2023 | Pettinga | |
| 12,286,302 B2* | 4/2025 | Pettinga | B65G 13/07 |
| 12,365,549 B2 | 7/2025 | Drummond | |
| 12,378,083 B2 | 8/2025 | Pettinga | |
| 2010/0108467 A1 | 5/2010 | Barreyre et al. | |
| 2010/0230247 A1* | 9/2010 | Mckee | B65G 47/66 198/804 |
| 2011/0132725 A1 | 6/2011 | Marshall et al. | |
| 2012/0227232 A1* | 9/2012 | Jabber | B65G 21/06 198/860.5 |
| 2019/0002210 A1 | 1/2019 | Hekman et al. | |
| 2021/0179365 A1 | 6/2021 | Pettinga | |
| 2022/0169454 A1 | 6/2022 | Schroader | |
| 2023/0278808 A1* | 9/2023 | Pettinga | B65G 47/66 198/600 |
| 2023/0312269 A1* | 10/2023 | Guruswamy | B65G 47/66 198/583 |
| 2023/0365346 A1 | 11/2023 | Dietrick, III | |
| 2024/0034570 A1 | 2/2024 | Berenbach et al. | |

FOREIGN PATENT DOCUMENTS

| | | | |
|---|---|---|---|
| DE | 102019101473 A1 | 7/2020 | |
| EP | 2455307 A1 | 5/2012 | |
| EP | 3699113 A1 | 8/2020 | |
| KR | 10-2022-0124440 A | 9/2022 | |
| WO | WO-2020136799 A1 * | 7/2020 | B65G 13/07 |
| WO | 2025/024451 A1 | 1/2025 | |

OTHER PUBLICATIONS

U.S. Non-Provisional Utility Patent Application for "Guard Assembly for A Conveyor System", unpublished (Filed Feb. 29, 2024), Jan Suchý (Inventor), Intelligrated Headquarters, LLC (Applicant), U.S. Appl. No. 18/591,532.

Non-Final Rejection Mailed on Oct. 9, 2025 for U.S. Appl. No. 18/591,511, 6 page(s).

Non-Final Rejection Mailed on Jul. 15, 2025 for U.S. Appl. No. 18/591,532, 10 page(s).

Extended European Search Report Mailed on Jul. 8, 2025 for EP Application No. 25157061, 11 page(s).

Extended European Search Report Mailed on Jul. 14, 2025 for EP Application No. 25154220, 10 page(s).

* cited by examiner

GUARD APPARATUS FOR A CONVEYOR SYSTEM

FIELD OF THE INVENTION

Various embodiments described herein relate generally to a material handling system for handling objects and, more particularly, to apparatuses for use with a conveyor system configured to facilitate transportation of objects along a conveyor surface.

BACKGROUND

Generally, in material handling environments like, but not limited to, distribution centers, warehouses, inventories, or shipping centers, a material handling system can convey, handle, sort, and organize various type of articles (for example objects, cartons, cases, containers, shipment boxes, totes, packages, and/or the like) using one or more conveyor systems. Through applied effort, ingenuity, and innovation, many of these identified problems have been solved by developing solutions that are included in embodiments of the present disclosure, many examples of which are described in detail herein.

SUMMARY

Various embodiments are directed to a guard apparatus for a conveyor system. The conveyor system includes a plurality of rollers rotatably disposed between a pair of side frames of the conveyor system. The guard apparatus includes a top cover and a first flange. The top cover is disposed in a first gap formed between a first roller and a second roller of the plurality of rollers. The first flange extends from a first end of the top cover into a second gap formed between a first end face of the first roller, a second end face of the second roller and a corresponding side frame of the conveyor system.

In various embodiments, the first flange includes a central arm, a first arm and a second arm. The central arm extends from the first end of the top cover. The first arm extends from the central arm in a first direction. The second arm extends from the central arm in a second direction such that the second direction is opposite to the first direction.

In various embodiments, the first arm extends into the second gap between the first end face of the first roller and the corresponding side frame of the conveyor system. In various embodiments the second arm extends into the second gap between the second end face of the second roller and the corresponding side frame of the conveyor system.

In various embodiments, the central arm, the first arm and the second arm form a T-shape.

In various embodiments, the first flange is configured to secure the top cover between the first roller and the second roller.

In various embodiments, the conveyor system includes a driving member configured to connect the first roller with the second roller and transmit motion from the first roller to the second roller.

In various embodiments, a top surface of the top cover is disposed below the driving member.

In various embodiments, the driving member is a rigid belt.

In various embodiments, each of a first edge and a second edge opposite to the first edge of the top cover is tapered to confirm with the first roller and the second roller, respectively.

In various embodiments, the top cover defines a plurality of friction-reducing features proximal to at least one roller of the conveyor system.

In various embodiments, the guard apparatus further includes a second flange extending from a second end of the top cover. In various embodiments, the guard apparatus includes at least one support rib extending between the first flange and the second flange.

In various embodiments, the second flange is configured to extend into the first gap formed between the first roller and the second roller of the plurality of rollers.

In various embodiments, the second flange includes a first arcuate side and a second arcuate side, such that the first arcuate side and the second arcuate side conforms with the first roller and the second roller, respectively.

In various embodiments, the first flange defines a first length. In various embodiments, the second flange defines a second length. In various embodiments, the second length is less than the first length.

In various embodiments, the top cover, the first flange and the second flange are formed integrally as a single component to form a guard apparatus.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Same numbers are used throughout the figures to reference like features and components. Embodiments incorporating teachings of the present disclosure are shown and described with respect to the figures presented herein, in which.

DETAILED DESCRIPTION

Figure 1A:
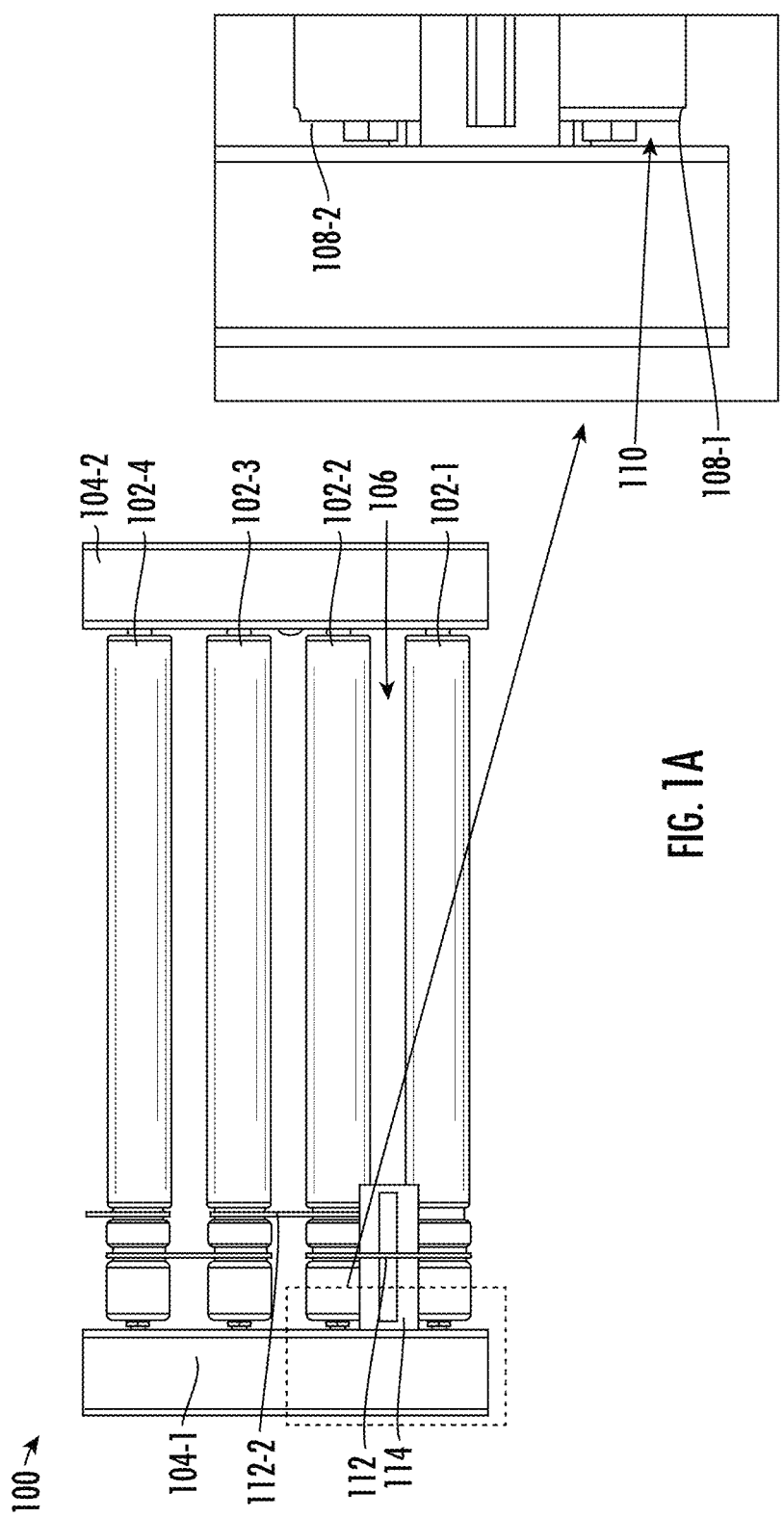
FIG. 1A illustrates a top view of a conveyor system, in accordance with various embodiments of the present disclosure.

Indeed, various embodiments may be implemented in many different forms and should not be construed as limited to the embodiments set forth herein. Other embodiments, and modifications and improvements of the described embodiments, will occur to those skilled in the art and all such other embodiments, modifications and improvements are within the scope of the present disclosure. Features from one embodiment or aspect may be combined with features from any other embodiment or aspect in any appropriate combination. For example, any individual or collective features of method aspects or embodiments may be applied to apparatus, product or component aspects or embodiments and vice versa. Like numbers refer to like elements throughout.

It should be understood at the outset that, although illustrative implementations of one or more aspects are illustrated below, the disclosed assemblies and methods may be implemented using any number of techniques, whether currently known or not yet in existence. The disclosure should in no way be limited to the illustrative implementations, drawings, and techniques illustrated and/or described below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. The phrases "in an embodiment," "in some embodiments," "according to one embodiment," "in various embodiments" and the like generally mean that a particular feature, structure, or characteristic following the phrase may be included in at least one embodiment of the present disclosure or may be included in more than one embodiment of the present disclosure (importantly, such phrases do not necessarily refer to the same embodiment).

As used herein, directional terms used to describe a component, configuration, action, position, direction, and/or the like (for example, "rearward," "an upward vertical direction," "laterally outward," "bottom," "top," and the like) are meant to be interpreted relative to a hypothetical conveyor system provided on an at least substantially flat horizontal surface, but the terms are not to be interpreted as requiring the conveyor system to be in this orientation at any particular time.

If the specification states a component or feature "may," "can," "could," "should," "would," "preferably," "possibly," "typically," "optionally," "for example," "often," or "might" (or other such language) be included or have a characteristic, that specific component or feature is not required to be included or to have the characteristic. Such a component or feature may be optionally included in some embodiments, or it may be excluded.

Conveyor systems are used in, for example, industrial manufacturing and packaging applications to facilitate the transportation of objects to a desired downstream location within a factory or a warehouse. For example, the conveyor systems include a plurality of cylindrical rollers disposed parallel and adjacent to each other along a length of the conveyor system. The plurality of rollers is arranged relative to one another such that the respective rolling surfaces of the rollers collectively define a conveyor path along which an object may be, at least, continuously transported towards the downstream location. Each roller rotates about an axis thereof to help transfer objects disposed thereon to an adjacent roller and, in doing so, together, the plurality of cylindrical rollers aids in transferring the objects along a conveyor travel path towards an end of the conveyer system. Further, the conveyor systems include conveyor frame(s) having various structural components, for example, but not limited to, sidewalls, panels, and/or the like, which are assembled relative to one another to define extremes capable of supporting the plurality of rollers therebetween.

In conveyor systems, the motion of the rollers poses a safety concern for an operator, such as, one who handles the items being transferred on the conveyor system. There is a risk of accidental finger injury of the operator handling the objects of the conveyor system. In some examples, a guard apparatus may be installed within the conveyor system, by being secured relative to the side frames of the conveyor system, to protect against physical injury of the operator. The severity of injury to the operator's finger stuck in a gap between the moving rollers and the stationary side frame may be high. Conventional guard apparatuses are not effective to prevent such incidents.

The guard apparatus includes one or more stationary cover portions configured to cover the gap between two adjacent rollers of the conveyor system. Although such guard apparatuses are used to prevent unauthorized and/or unintended access to an internal portion, they fail to laterally secure the guard apparatus between the side frames. Additionally, the guard apparatus is subjected to repeated loading cycles, leading to localized deformations. Such deformations, in the absence of lateral security, may cause a loosening of the guard apparatus installed within the conveyor system, which may result in undesirable movement thereof relative to the conveyor frame, undesirable noise (for example, rattling), partial inoperability of the guard apparatus, and/or unintentional disassembly of the guard apparatus relative to the conveyor system.

Various embodiments of the present disclosure are directed to a guard apparatus for a conveyor system. FIG. 1A illustrates a top view of a conveyor system 100, in accordance with various embodiments of the present disclosure. The conveyor system 100 includes a plurality of rollers 102 (such as a first roller 102-1, a second roller 102-2, a third roller 102-3, and a fourth roller 102-4), hereinafter alternatively, individually, and collectively referred to as "the roller(s) 102" or "adjacent rollers 102-1, 102-2", disposed between a pair of side frames 104-1, 104-2 (hereinafter alternatively and collectively referred to as "the side frames 104"), such that a first gap 106 exists between any two adjacent rollers 102-1 and 102-2.

As shown in FIG. 1A, each roller 102 defines an end face (for example, the first roller 102-1 defines a first end face 108-1, the second roller 102-2 defines a second end 108-2) hereinafter alternatively, individually, and collectively referred to as "the end face(s)". In various embodiments, a second gap 110 is formed between the first end face 108-1 of the first roller 102-1, the second end face 108-2 of the second roller 102-2 and a corresponding side frame 104-1.

The adjacent rollers 102-1, 102-2 are joined by one or more driving members (112), such as a belt or an O-ring at one end, where the driving member 112 is configured to transmit a rotary motion from one roller to the other, without slippage. The conveyor system 100 may include multiple such driving members configured to connect each pair of adjacent rollers 102-1, 102-2 to transmit the motion throughout a length of the conveyor system 100 in order to facilitate transfer of objects.

Figure 1B:
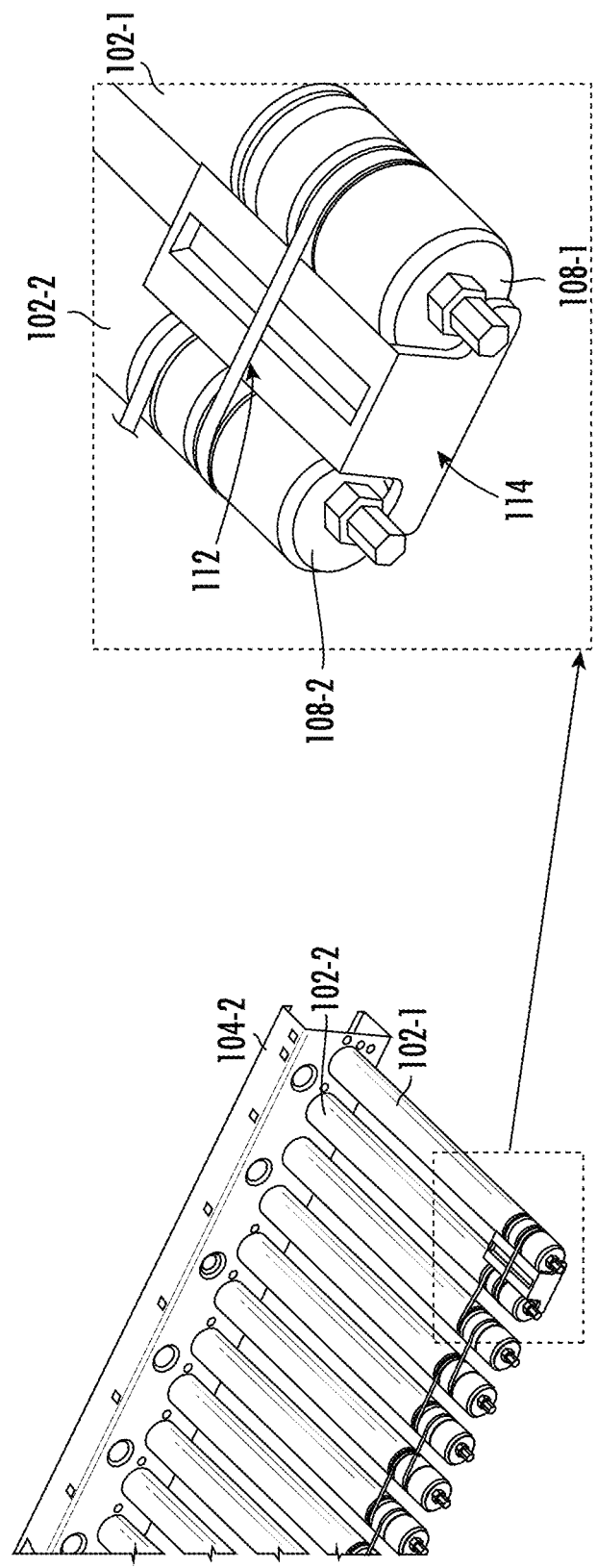
FIG. 1B illustrates a front perspective view of a guard apparatus and a plurality of rollers of the conveyor system, in accordance with various embodiments of the present disclosure.

As seen in FIG. 1A and FIG. 1B, a guard apparatus 114 is positioned within the conveyor system 100 to provide coverage over at least a portion of the first gap 106 between two adjacent rollers 102-1, 102-2. In some embodiments, the guard apparatus 114 further extends into at least a portion of the second gap 110 between the first end face 108-1 of the first roller 102-1, the second end face 108-2 of the second roller 102-2, and the corresponding side frame 104-1 of the conveyor system 100.

Figure 2A:
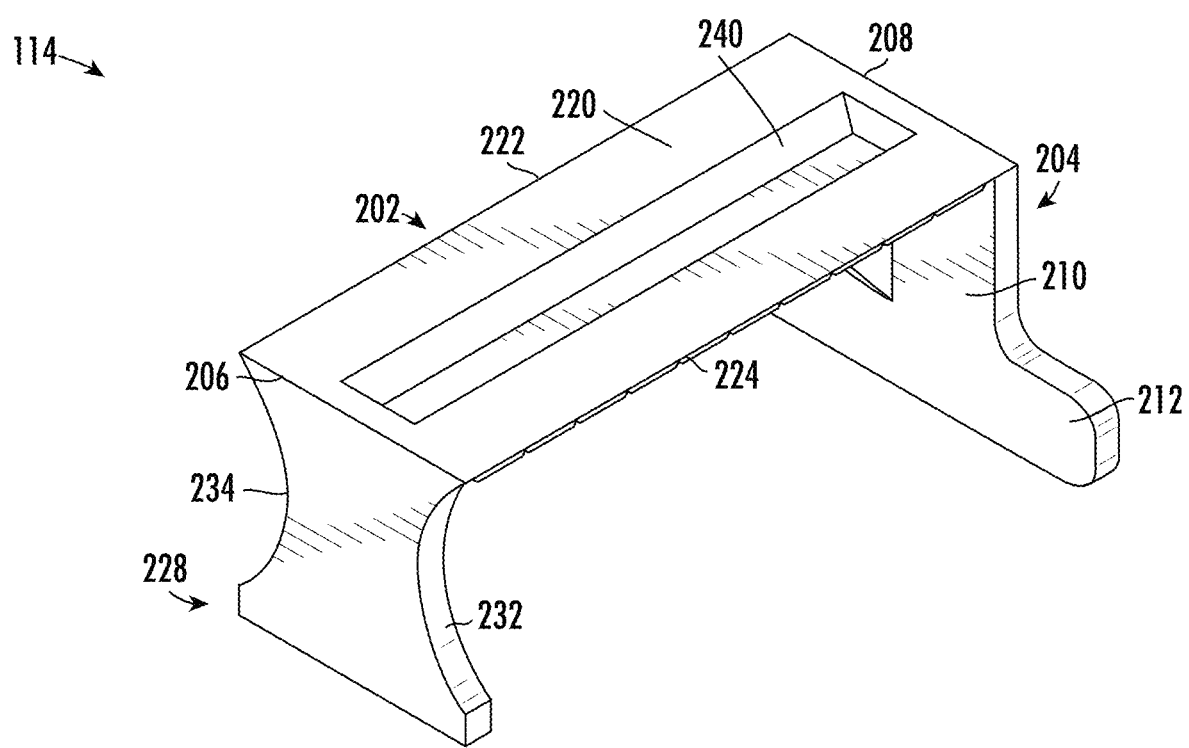
FIG. 2A illustrates a top perspective view of the guard apparatus of FIG. 1B, in accordance with various embodiments of the present disclosure.

Referring to FIG. 2A a top perspective view of the guard apparatus 114 is illustrated. The guard apparatus 114 includes a top cover 202 and a first flange 204. The top cover 202 is disposed in the first gap 106 (See FIG. 1A) between the first roller 102-1 and the second roller 102-2 of the plurality of rollers 102. The top cover 202 includes a first end 208 and a second end 206. The first flange 204 extends from the first end 208 of the top cover 202 into the second gap 110 formed between the first end face 108-2 of the first roller 102-1, the second end face 108-2 of the second roller 102-2 and the corresponding side frame 104-1 of the conveyor system 100 (See FIG. 1A and FIG. 1B).

Figure 2B:
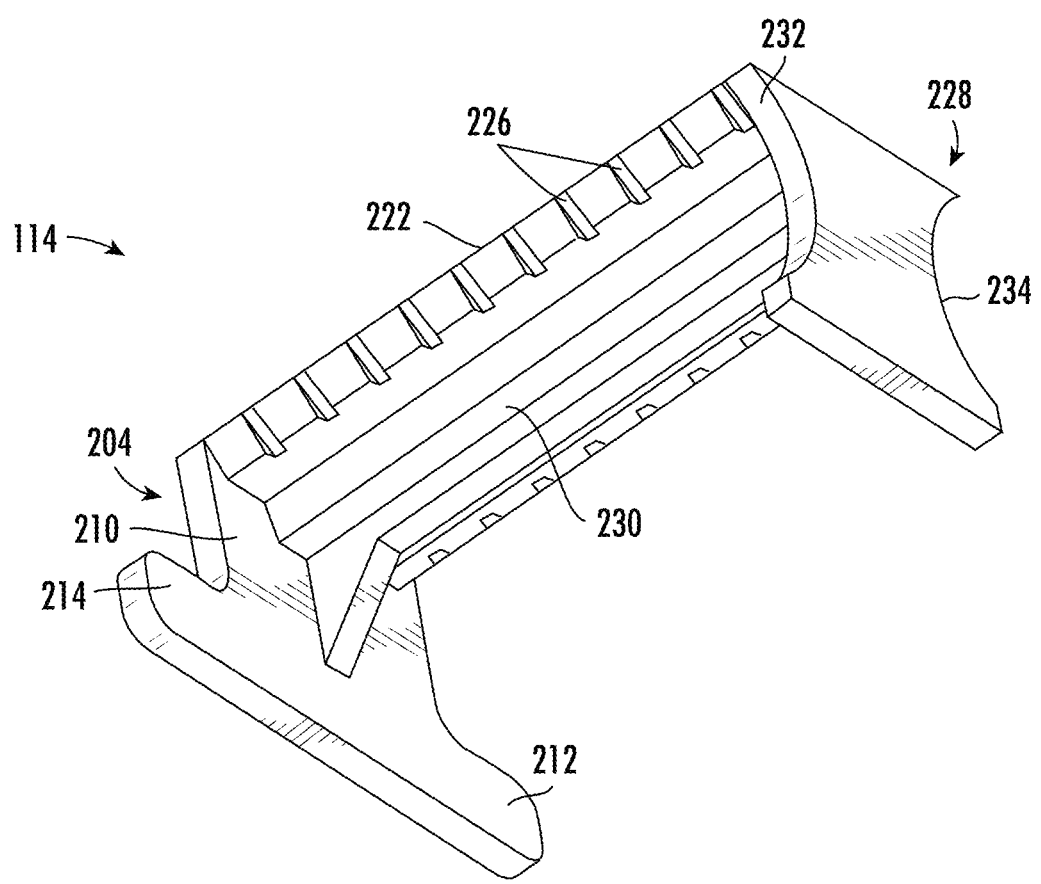
FIG. 2B illustrates a bottom perspective view of the guard apparatus of FIG. 2A, in accordance with various embodiments of the present disclosure.

In various embodiments, the first flange 204 includes a central arm 210, a first arm 212 and a second arm 214 (See FIG. 2B). The central arm 210 extends from the first end 208 of the top cover 202 into the second gap 110. The first arm 212 extends from the central arm 210 in a first direction and the second arm 214 extends from the central arm 210 in a second direction, such that the second direction is opposite to the first direction. In various embodiments, the first arm 212 particularly extends between the second end face 108-2 of the second roller 102-2 and the corresponding side frame 104-1 of the conveyor system 100. In various embodiments, the second arm 214 particularly extends between the first end face 108-1 of the first roller 102-1 and the corresponding side frame 104-1 of the conveyor system 100. In various embodiments, the central arm 210, the first arm 212 and the second arm 214 forms a T-shape. In various embodiments, the first arm 212 and the second arm 214 are configured to contact at least a portion of the first end face 108-1 and the second end face 108-2 respectively. In various embodiments, edges of the first arm 212 and the second arm 214 are configured to contact a roller support element (not shown). In various embodiments, the first flange 204 is configured to secure the top cover 202 between the first roller 102-1 and the second roller 102-2. In various embodiments, a top surface 220 of the top cover 202 is disposed below the driving member 112.

In various embodiments, each of a first edge 222 and a second edge 224 opposite to the first edge 222 of the top cover 202 is tapered to confirm with the first roller 102-1 and the second roller 102-2, respectively. In various embodiments, the top cover 202 defines a plurality of friction-reducing features 226 (See FIG. 2B) proximal to at least one roller 102-1, 102-2 of the conveyor system 100. In various embodiments, the friction-reducing features 226 include a plurality of tapered grooves. In various embodiments, the friction-reducing features 226 are equidistantly spaced-apart from each other. In various embodiments, the top surface 220 is enclosed by the first end 208, the second end 206, the first edge 222 and the second edge 224 of the top cover 202.

In various embodiments, the guard apparatus 114 further includes a second flange 228 extending from the second end 206 of the top cover 202. In various embodiments, the guard apparatus 114 includes at least one support rib 230 (See FIG. 2B) extending between the first flange 204 and the second flange 228. In various embodiments, the second flange 228 is configured to extend into the first gap 106 formed between the first roller 102-1 and the second roller 102-2 of the plurality of rollers 102. In various embodiments, the second flange 228 includes a first arcuate side 232 and a second arcuate side 234, such that the first arcuate side 232 and the second arcuate side 234 conforms with the first roller 102-1 and the second roller 102-2, respectively.

In various embodiments, the first flange 204 defines a first length "L1". In various embodiments, the second flange 228 defines a second length "L2". In various embodiments, the second length "L2" is less than the first length "L1". In various embodiments, the guard apparatus 114 may define a stiffening groove 240 on the top cover 202 to strengthen the guard apparatus 114.

In various embodiments, the guard apparatus 114 may be made up of light-weight polymer, such as plastics manufactured through, for example, injection molding. To this end, the top cover 202, the first flange 204 and the second flange 228 are formed integrally as a single component to form a guard apparatus 114.

Shape of the illustrated guard apparatus 114 should not be construed as limited. Instead, other shapes and features will be apparent to the person skilled in the art, albeit with few changes to the features described and illustrated herein. For example, the guard apparatus 114 may include an inverted U-shaped elongated wall with extending side flanges as a part of the top cover 202. Further, the guard apparatus 114 may include multiple fillets, chamfer, or edge radii.

The present disclosure provides an improved guard apparatus 114 for the conveyor system 100. The guard apparatus 114 provides an effective protection against injury as it is configured to cover the gap formed between stationary members (such as side frames 104-1, 104-2) and movable members (such as rollers 102-1, 102-2) of the conveyor system 100. The guard apparatus 114 as per the present disclosure also prevents unauthorized and/or unintended access to portion of conveyor system 100. Moreover, the guard apparatus 114 also prevents accumulation of debris, or small article, such as fasteners or coins, which may lead to jamming of the conveyor system 100.

Various embodiments of the present disclosure provide further advantages. As mentioned hereinafter, the term "lateral" or "laterally" is used to refer to the direction along length of the roller of the conveyor system and the term "longitudinal" or "longitudinally" is used to refer to the direction along which an object moves along while the conveyor system is in an operating condition. Owing to the first flange 204, the guard apparatus 114 is secured laterally as the first arm 212 and the second arm 214 are configured to be engaged with the first end face 108-1 and the second end face 108-2 of the first roller 102-1 and the second roller 102-2 respectively. Additionally, owing to the first arcuate side 232 and the second arcuate side 234 conforming to the adjacent rollers 102-1, 102-2, the guard apparatus 114 is longitudinally secured. Moreover, the first arm 212 and the second arm 214 of the first flange 204 are configured to contact a roller support element and provide a vertical securing of the guard apparatus 114. The lateral, longitudinal and vertical security of the guard apparatus 114 reduces undesirable noise (for example, rattling) and damage of the guard apparatus 114, thereby increasing the usable life of the guard apparatus 114.

It may be desirable to manufacture the guard apparatus 114 using simpler methods, such as injection molding. The present disclosure provides a simplified structure for the guard apparatus 114 thereby reducing the manufacturing costs, etc. Owing to the design of the guard apparatus 114, the elements of the guard apparatus 114 are formed integrally as a single component as the top cover 202, the first flange 204 and the second flange 228 are formed integrally as a single component to form the guard apparatus 114. This reduces the number of components and the cost of installation of the guard apparatus 114 on the conveyor system 100.

Owing to the stiffening groove 240 on the top cover 202, the strength of the top cover 202 is improved without usage of additional or separate stiffening elements, such as metal fasteners, or metal support plate, etc. Additionally, owing to the support rib 230 extending between the first flange 204 and the second flange 228, the bending strength of the top cover 202 is enhanced. An improvement in strength and stiffness of the top cover 202 leads to reduced localized deformations of the guard apparatus 114 due to, for example, repeated or cyclic loading.

Owing to the friction-reducing features 226 of the top cover 202, the frictional forces between the stationary top cover 202 of the guard assembly 114 and the adjacent rollers 102-1, 102-2 of the conveyor system 100 (such as a first roller 102-1 and a second roller 102-2) may be significantly reduced thereby increasing the usable life of the guard apparatus 114.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (for example, "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Many modifications and other embodiments of the present disclosure will be apparent to one skilled in the art to which the present disclosure pertain having the benefit of teachings presented in the foregoing descriptions and the associated drawings. Although the figures only show certain components of the system described herein, it is understood that various other components may be present. Therefore, it is to be understood that the present disclosure should not be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A guard apparatus for a conveyor system comprising a plurality of rollers rotatably disposed between a pair of side frames thereof, the guard apparatus comprising:
   a top cover disposed in a first gap formed between a first roller and a second roller of the plurality of rollers; and
   a first flange extending from a first end of the top cover into a second gap formed between a first end face of the first roller, a second end face of the second roller and a corresponding side frame of the conveyor system.

2. The guard apparatus of claim 1, wherein the first flange comprises:
   a central arm extending from the first end of the top cover;
   a first arm extending from the central arm in a first direction; and
   a second arm extending from the central arm in a second direction, wherein the first direction is opposite to the second direction.

3. The guard apparatus of claim 2, wherein the first arm extends into the second gap between the first end face of the first roller and the corresponding side frame of the conveyor system, and wherein the second arm extend into the second gap between the second end face of the second roller and the corresponding side frame of the conveyor system.

4. The guard apparatus of claim 2, wherein the central arm, the first arm and the second arm form a T-shape.

5. The guard apparatus of claim 1, wherein the first flange is configured to secure the top cover between the first roller and the second roller.

6. The guard apparatus of claim 1, further comprising a driving member configured to:
   connect the first roller with the second roller; and
   transmit motion from the first roller to the second roller.

7. The guard apparatus of claim 6, wherein a top surface of the top cover is disposed below the driving member.

8. The guard apparatus of claim 6, wherein the driving member is a rigid belt.

9. The guard assembly of claim 1, wherein each of a first edge and a second edge opposite to the first edge of the top cover is tapered to conform with the first roller and the second roller, respectively.

10. The guard apparatus of claim 1, wherein the top cover defines a plurality of friction-reducing features proximal to at least one roller of the conveyor system.

11. The guard apparatus of claim 1, further comprising:
    a second flange extending from a second end of the top cover; and
    at least one support rib extending between the first flange and the second flange.

12. The guard apparatus of claim 11, wherein the second flange is configured to extend into the first gap formed between the first roller and the second roller of the plurality of rollers.

13. The guard apparatus of claim 11, wherein the second flange comprises a first arcuate side and a second arcuate side, each of the first arcuate side and the second arcuate side conforming with first roller and the second roller, respectively.

14. The guard apparatus of claim 11, wherein a first length of the first flange is more than a second length of the second flange.

15. The guard apparatus of claim 11, wherein the top cover, the first flange and the second flange are formed integrally as a single component.

* * * * *